United States Patent [19]
Ueda

[11] Patent Number: 5,371,478
[45] Date of Patent: Dec. 6, 1994

[54] POWER AMPLIFYING UNIT USING A POWER AMPLIFYING MODULE

[75] Inventor: Hideki Ueda, Tokyo, Japan
[73] Assignee: NEC Corporation, Japan
[21] Appl. No.: 196,833
[22] Filed: Feb. 15, 1993

Related U.S. Application Data

[63] Continuation of Ser. No. 863,498, Mar. 30, 1992, abandoned, which is a continuation of Ser. No. 625,767, Dec. 5, 1990, abandoned.

[30] Foreign Application Priority Data

Dec. 5, 1989 [JP] Japan ................... 1-316670

[51] Int. Cl.⁵ .............................................. H03G 3/30
[52] U.S. Cl. .................................. 330/285; 330/279; 330/207 P; 330/129
[58] Field of Search ................ 330/285, 127, 129, 178, 330/179, 136, 207 P, 298; 455/89, 127, 240, 117; 375/98

[56] References Cited

U.S. PATENT DOCUMENTS

| | | | |
|---|---|---|---|
| 4,320,350 | 3/1982 | Drapac | 330/285 |
| 4,380,089 | 4/1983 | Wei | 455/127 |
| 4,433,304 | 2/1984 | Engle | 330/281 |
| 4,602,218 | 7/1986 | Vilmur et al. | 330/279 |
| 4,636,741 | 1/1987 | Mitzlaff | 330/297 |
| 4,709,404 | 11/1987 | Tamura et al. | 330/298 |
| 4,994,757 | 2/1991 | Bickley et al. | 330/285 |
| 5,038,112 | 8/1991 | O'Neill | 330/207 P |
| 5,043,672 | 8/1991 | Youn | 330/279 |

FOREIGN PATENT DOCUMENTS

| | | | |
|---|---|---|---|
| 2148640 | 4/1972 | Germany | 330/285 |
| 2135841 | 9/1984 | United Kingdom . | |

OTHER PUBLICATIONS

Patent Abstracts of Japan, vol. 5, No. 145 (Publication No. 56-78209A), Jun. 1981.
Patent Abstracts of Japan, vol. 10, No. 275 (Publication No. 61-98007A), May 1986.

*Primary Examiner*—Robert J. Pascal
*Assistant Examiner*—Tan Dinh
*Attorney, Agent, or Firm*—Ostrolenk, Faber, Gerb & Soffen

[57] ABSTRACT

A power amplifying unit implemented with a power amplifying module and connectable to a transmitter/receiver of a mobile radio telephone apparatus. A DC current amplifier is connected to a control voltage terminal included in the PA module. Different voltages generated by individual power source circuits are selectively applied to the DC current amplifier. The unit is operable with any of one of various PA modules, each requiring a particular voltage to be applied to a control voltage terminal thereof.

11 Claims, 5 Drawing Sheets

POWER AMPLIFYING UNIT USING A POWER AMPLIFYING MODULE

This is a continuation of application Ser. No. 07/863,498, filed on Jan. 30, 1992, by Hideki Ueda entitled POWER AMPLIFYING UNIT USING A POWER AMPLIFYING MODULE and now abandoned, which is a continuation of application Ser. No. 07/625,767, filed on Dec. 5, 1990 and now abandoned.

BACKGROUND OF THE INVENTION

The present invention relates to a power amplifying unit implemented with a power amplifying module and, more particularly, to a power amplifying unit connectable to a transmitter/receiver of a mobile radio telephone apparatus.

Today, a mobile radio telephone apparatus is available in a variety of configurations and has a transmitter/receiver therein. A power amplifying unit, or booster, is connected to the transmitter/receiver in order to amplify a transmission output to a desired power before radiating it via an antenna or to amplify a signal coming in through the antenna before feeding it to the receiver. In many boosters for such an application, an amplifier for amplifying a transmission output is implemented with a power amplifying module (sometimes referred to as a PA module hereinafter). A PA module contributes a great deal to the miniaturization and mass production of boosters as well as to the simplification of a heat radiation structure. Various types of PA modules are commercially available, and each has at least a control voltage terminal for receiving a control voltage from a DC current amplifier which is a control element included in the booster. Generally, the maximum control voltage that may be applied to the control voltage terminal differs from one PA module to another, depending on the circuit design and the kind of transistors and other elements used. On the other hand, a power source voltage applied to the DC current amplifier is usually a fixed voltage. Hence, the PA module usable with the power amplifying unit or booster is limited to a particular type which allows the fixed voltage to coincide with the maximum control voltage.

SUMMARY OF THE INVENTION

It is therefore an object of the present invention to provide a power amplifying unit operable with any of various different types of power amplifying modules or PA modules.

It is another object of the present invention to provide a power amplifying unit for a mobile radio telephone apparatus or similar apparatus which is operable with various types of power amplifying modules or PA modules which are different in the maximum control voltage to be applied to a control voltage terminal.

A power amplifying unit comprises a power amplifying module for amplifying input power to produce output power. The power amplifying module has a control terminal to which a control voltage for controlling the output power is applied. A control circuit controls the power amplifying module such that the maximum value of the control voltage applied to the control terminal is selectively changed.

DESCRIPTION OF THE PREFERRED EMBODIMENTS

While preferred embodiments of the present invention will be described in relation to a portable telephone, the present invention is of course applicable to any other mobile radio telephone apparatuses.

First Embodiment

Figure 1:
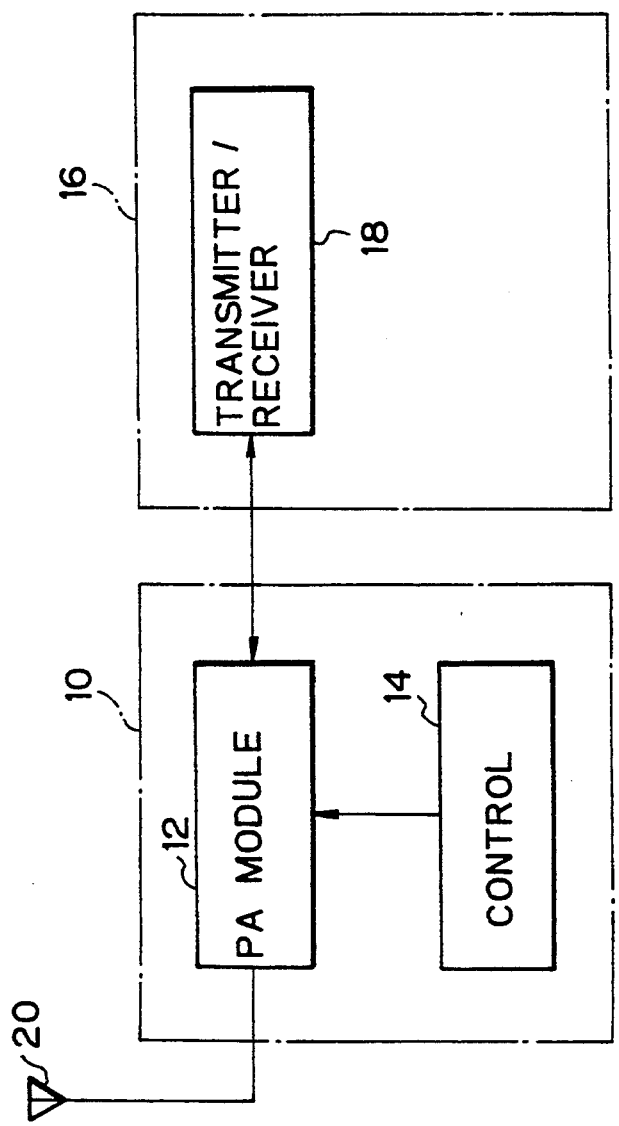
FIG. 1 is block diagram schematically showing a power amplifying unit of the present invention applied to a portable telephone.

Referring to FIG. 1 of the drawings, a power amplifying unit or booster embodying the present invention is shown and generally designated by the reference numeral 10. As shown. the booster 10 has a power amplifying device or PA module 12 and a control circuit 14. The booster 10 is connected to a transmitter/receiver 18 and an antenna 20 which are included in a portable telephone 16.

Figure 2:
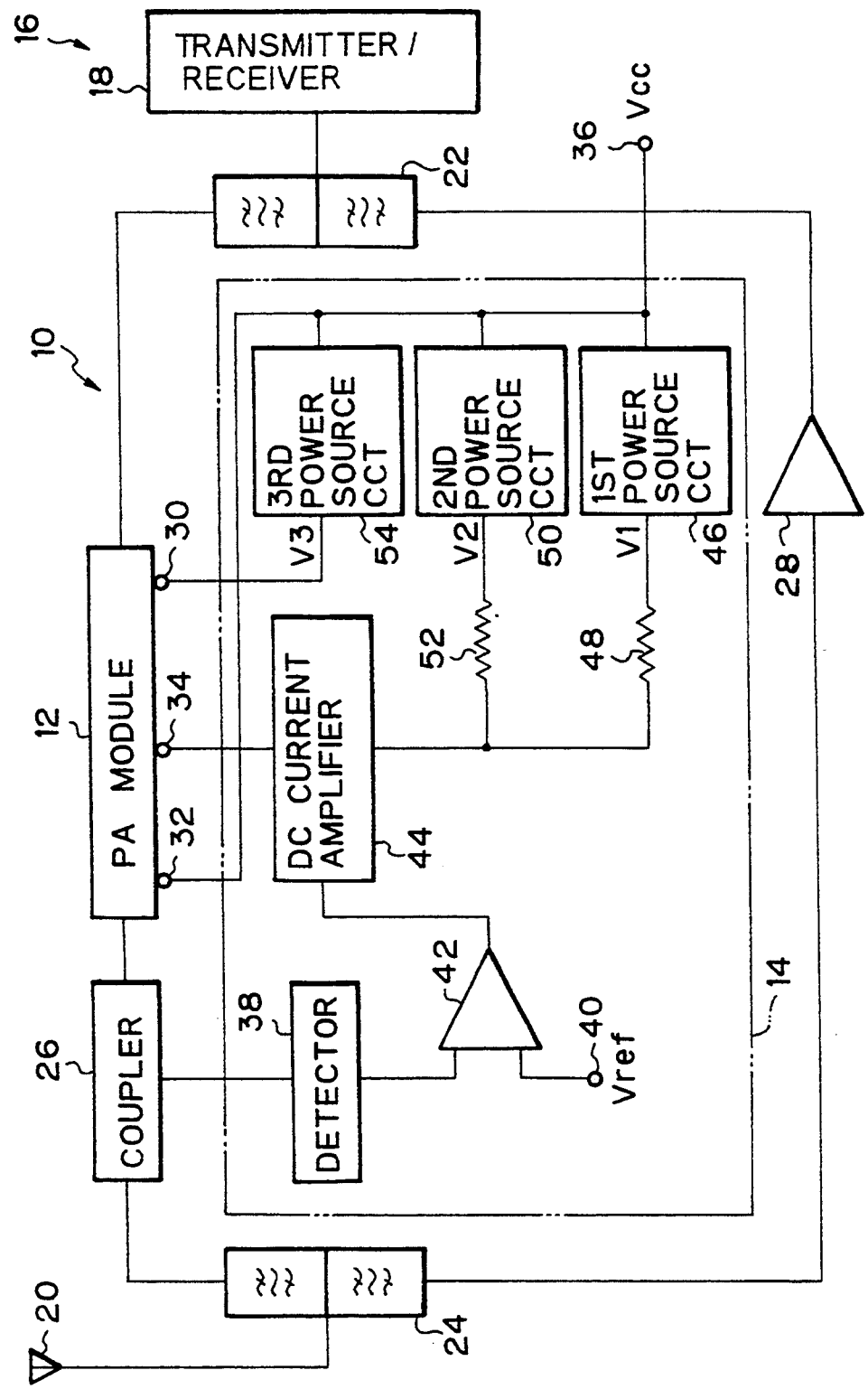
FIG. 2 is a block diagram schematically showing a first embodiment of the present invention.

As shown in FIG. 2 specifically, the booster 10 has a first filter 22, a series connection of a second filter 24 and a coupler 26, and an amplifier 28 in addition to the PA module 12 and control circuit 14. The filter 22 is connected between the transmitter/receiver 18 and the PA module 12, while the series connection of the filter 24 and coupler 26 is connected between the PA module 12 and the antenna 20. The amplifier 28 is connected between the filters 22 and 24. The PA module 12 has a first-stage voltage terminal 30, a last-stage voltage terminal 32, and a control voltage terminal 34 which are connected to the control circuit 14. The control circuit 14 has a power source terminal 36 to be connected to a battery or similar external power source that supplies a power source voltage Vcc. In the control circuit 14, a detector 38 is connected to the coupler 26 and implemented with a diode, for example. A reference voltage Vref is fed to a reference voltage terminal 40 for controlling the transmission output of the telephone 16. The output of the detector 38 and the reference voltage Vref from the terminal 40 are applied to a comparator 42. A DC current amplifier 44 receives the output of the comparator 42 and in turn applies an output voltage thereof to the control voltage terminal 34 of the PA module 12. A first power source circuit 46 is connected between the power source terminal 36 and the DC current amplifier 44 via a resistor or a jumper line 48. The output voltage V1 of the power source circuit 46 is applied to the DC current amplifier 44. A second power source circuit 50 is connected between the power source terminal 36 and the DC current amplifier 44 via a resistor or a jumper line 52 to feed an output voltage V2 thereof to the current amplifier 44. A third power source circuit 54 is connected between the power source terminal 36 and the first-stage voltage terminal 30 of the PA module 12 and delivers an output voltage V3 thereof to the terminal 30. The power source terminal 36 is directly connected to the last-stage voltage terminal 32 of the PA module 12. Regarding the PA module 12, use may be made of any one of commercially available products having an identical configuration, as tabulated below.

TABLE

| MANU-FACTURER | TYPE | STANDARD VOLTAGE (V) | | |
|---|---|---|---|---|
| | | TERMINAL 30 | TERMINAL 32 | TERMINAL 34 |
| MITSUBISHI | M 67754 | 13.8 | 8 | 8 |
| MOTOROLA | MHW 807-1 | 13.8 | 8 | 8 |
| HITACHI | PF 0020 | 13.8 | 8 | 8 |
| TOSHIBA | S-AU 33 | 13.8 | 8 | 12 |

Not all of the products listed above have the same standards, and especially the control voltage to be applied to the control voltage terminal 34 depends on the product. Each such product is so designed as to operate normally when a particular standardized control voltage is applied from the current amplifier 44 to the control voltage terminal 34. Assume that the output voltages V1 and V2 of the first and second power source circuits 46 and 50 are 8 volts and 12 volts, respectively. Then, when the PA module 12 is implemented with Motorola MHW 807-1, for example, which applies 8 volts to the control voltage terminal 34, the output voltage V1 (8 volts) of the first power source circuit 46 will be fed to the DC current amplifier 44 to cause the current amplifier 44 to output 8 volts. On the other hand, when Toshiba S-AU33 which applies 12 volts to the control voltage terminal 34 is used, the output voltage V2 (12 volts) of the second power source circuit 50 will be fed to the current amplifier 44 to cause it to output 12 volts. In this manner, either one of the first and second power source circuits 46 and 50 that matches the PA module 12 used is selected such that the DC current amplifier 44 delivers a particular standardized control voltage to the control voltage terminal 34. In the illustrative embodiment, each of the resistors or jumper lines 52 is removable to feed the output voltage of the desired one of the power source circuits 46 and 50 to the DC current amplifier 44.

Second Embodiment

Figure 3:
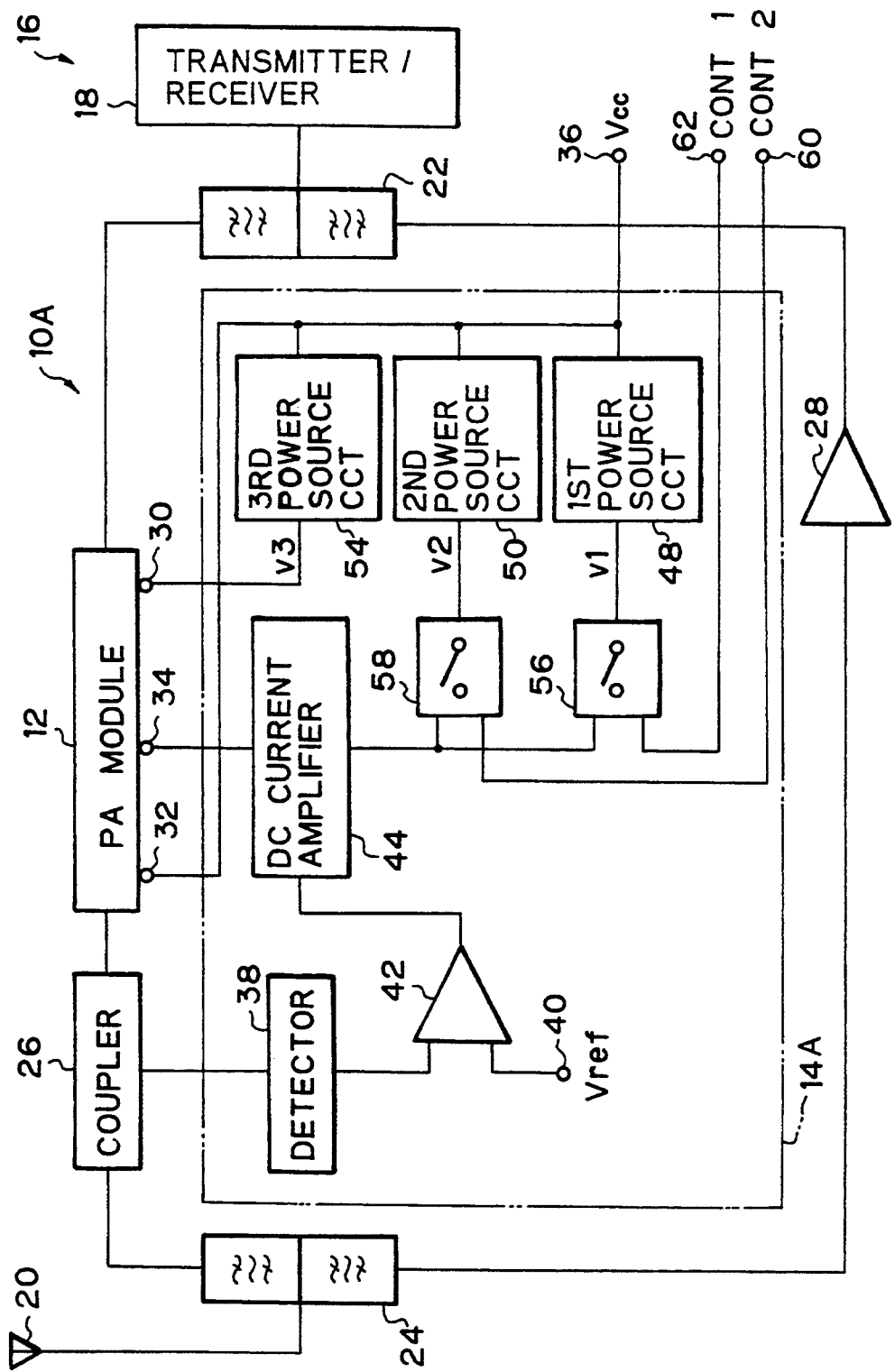
FIG. 3 is a block diagram schematically showing a second embodiment of the present invention.

FIG. 3 shows an alternative embodiment of the present invention. As shown, the booster, generally 10A, has a control circuit 14A which is provided with a first and a second ON/OFF switch 56 and 58 and a first and a second control signal terminal 60 and 62, in place of the resistors or jumper lines 48 and 52 of the first embodiment. Control signals CONT1 and CONT2 are respectively applied to the terminals 60 and 62 for selectively turning an associated one of the switches 56 and 58 on or off. The rest of the construction is identical with the construction shown in FIG. 2. In this configuration, the control signals CONT1 and CONT2 fed from the outside are each routed through the terminal 60 or 62 to the switch 56 or 58 to turn it on or off. As a result, either one of the first and second power source circuits 50 that matches the PA module 12 used is selected to feed a particular control voltage from the DC current amplifier 44 to the control voltage terminal 34.

Third Embodiment

Figure 4:
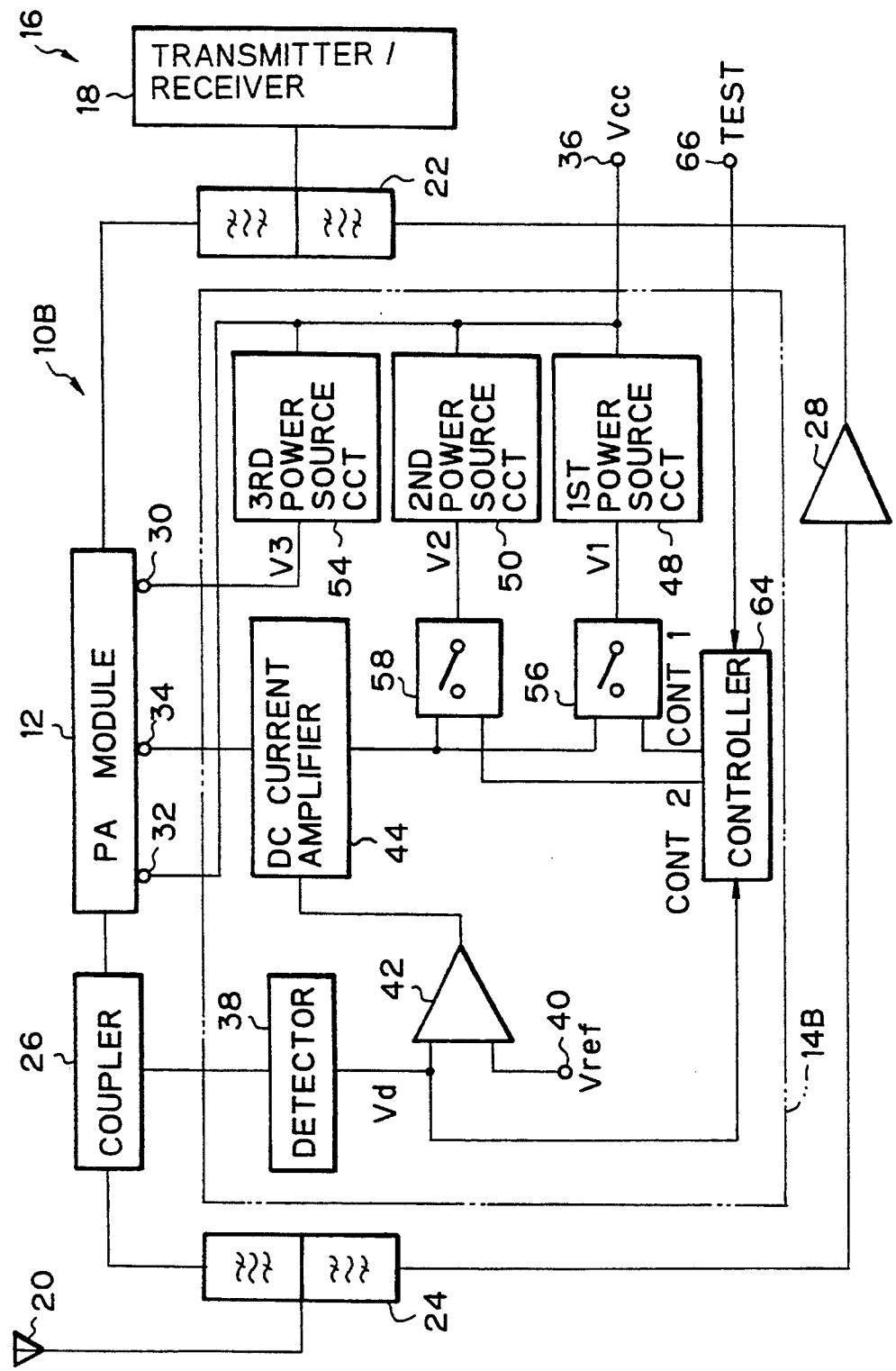
FIG. 4 is a block diagram schematically showing a third embodiment of the present invention.

FIG. 4 shows another alternative embodiment of the present invention. As shown, the booster, generally 10B, has a control circuit 14B which is essentially similar to the control circuit 14A, FIG. 3, except that the control signal terminals 60 and 62 are replaced with a controller 64 and a test mode signal terminal 66. The controller 64 controls each of the switches 56 and 58 on or off by the control signal CONT1 or CONT2. A test mode signal TEST is fed to the controller 64 for causing it to operate in a test mode. The rest of the construction is essentially the same as the construction shown in FIG. 3. The output voltage Vd of the detector 38 is fed to the controller 64, as illustrated. In operation, in response to the test mode signal TEST fed from the outside, the controller 64 turns one of the switches 56 and 58 on and the other switch off. Such an operation will be described more specifically with reference to FIG. 5.

Figure 5:
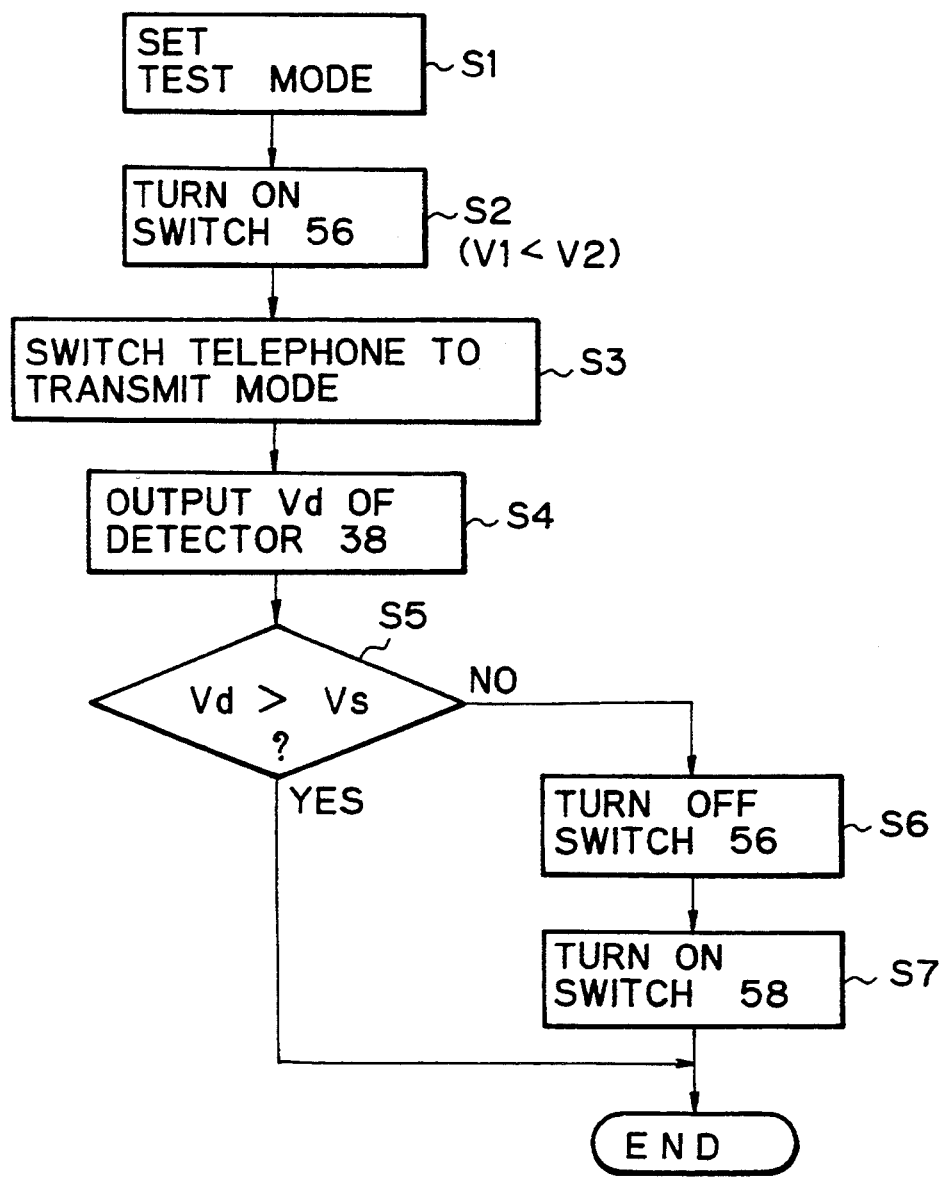
FIG. 5 is a flowchart demonstrating a specific operation of the third embodiment.

As shown in FIG. 5, after the PA module 12 has been mounted on the booster 10B, the test mode signal TEST is fed to the controller 64 via the terminal 66 to set up a test mode (step S1). Then, the controller 64 turns the first switch 56 on (S2). At this instant, the output voltage V1 of the first power source circuit 50 is assumed to be lower than the output voltage V2 of the second power source circuit 50. Subsequently, the telephone 16 to which the booster 10B is connected is switched to a transmit mode (S3). In this condition, the output voltage $V_1$ of the switch 56 is fed to the control voltage terminal 34 of the PA module 12, and the detector 38 produces an output voltage Vd (S4). The controller 64 has stored a detection voltage Vs which is associated with the desired output of the PA module 12 beforehand. The controller 64 compares the instantaneous output voltage Vd of the detector 48 with the reference voltage Vs (S5). If the voltage Vd is higher than the voltage Vs as determined in the step S5, the controller 64 maintains the switch 56 in the ON state. If the answer of the step S5 is NO, the controller 64 turns the switch 56 off (S6) and turns the switch 58 on (S7) so as to select the voltage V2 higher than the voltage V1. As a result, the voltage V2 is fed from the DC current amplifier 44 to the control voltage terminal 34 of the PA module 12.

While the illustrative embodiments have concentrated on only two voltages V1 and V2 which are selectively fed to the DC current amplifier 44, the present invention is of course practicable with three or more different voltages or power source circuits in matching relation to the standard voltages of PA modules.

In summary, in accordance with the present invention, a power amplifying unit implemented with a PA module feeds particular different voltages generated by individual power source circuits to a DC current amplifier which is connected to the control voltage terminal of the PA module. This allows the power amplifying unit to operate with any desired one of various kinds of PA modules each requiring a particular voltage to be fed to the control voltage terminal thereof.

Various modifications will become possible for those skilled in the art after receiving the teachings of the present disclosure without departing from the scope thereof.

What is claimed is:

1. A power amplifying unit, which comprises:
    means for receiving one of a plurality of power amplifying modules, each of which has a different predetermined maximum control voltage value which must not be exceeded and each having an input terminal, an output terminal and a control terminal for receiving the control voltage;
    a plurality of power sources, each having an output voltage corresponding to one of the predetermined maximum control voltage values; and control means for selectively applying to the control terminal of said one power amplifying module the power source output voltage which corresponds to the predetermined maximum control voltage value of said one power amplifying module.

2. A unit as claimed in claim 1, wherein there are first and second power sources having output voltages corresponding to first and second maximum control voltage values of first and second power amplifier modules, respectively, one of which power amplifier modules is received by the receiving means and wherein the control means comprises:

a DC current amplifier for feeding an output voltage of said DC current amplifier to said one power amplifier module; and switching means for selectively connecting either one of said first and second power sources to said DC current amplifier to feed said first output voltage or said second output voltage to said DC current amplifier in accordance with whether said power amplifier module is said first power amplifier module or said second power amplifier module.

3. A unit as claimed in claim 1, wherein said switching means comprises:

first mounting and dismounting means for mounting and dismounting a first resistor connected between said DC current amplifier and said first power source circuit; and second mounting and dismounting means for mounting and dismounting a second resistor connected between said DC current amplifier and said second power source circuit.

4. A unit as claimed in claim 1, wherein said switching means comprises:

first mounting and dismounting means for mounting and dismounting a first jumper line connected between said DC current amplifier and said first power source circuit; and second mounting and dismounting means for mounting and dismounting a second jumper line connected between said DC current amplifier and said second power source circuit.

5. A unit as claimed in claim 1, wherein said switching means comprises:

a first switch connected between said DC current amplifier and said first power source circuit for receiving a first control signal fed from the outside; and a second switch connected between said DC current amplifier and said second power source circuit for receiving a second control signal from the outside.

6. A unit as claimed in claim 5, wherein said switching means further comprises a controller for feeding said first and second control signals to said first and second switches, respectively, in response to a test mode signal fed from the outside.

7. A unit as claimed in claim 1, wherein said control means further comprises a plurality of power source circuits each feeding particular output power different from said first and second output voltages to said DC current amplifier, said switching means feeding one of said output voltages to said DC current amplifier at a time.

8. The method of applying an appropriate control voltage to one of a plurality of power amplifying modules connected in a power amplifying unit, each of said modules having different predetermined maximum control voltage values which must not be exceeded and each having an input terminal, an output terminal and a control terminal for receiving the control voltage, which method comprises the steps of:

supplying the input terminal of said one power amplifier (PA) module with a radio frequency signal to be transmitted;

providing a plurality of power sources, each having an output voltage corresponding to one of the predetermined maximum control voltage values; and selectively supplying to said one PA module power source the output voltage which corresponds to the predetermined maximum control voltage of said one PA module.

9. A method as claimed in claim 8, wherein said step of selectively controlling said control voltage comprises the step of applying one of first and second voltages to said PA module as said control voltage, said first and second voltages being different from each other.

10. A method as claimed in claim 9, wherein said applying step comprises the step of manually applying one of said first and second voltages to said PA module.

11. A method as claimed in claim 9, further comprising the step of detecting the output power level of said PA module to produce a detection signal, wherein said applying step comprises the step of, responsive to said detection signal, applying one of said first and second voltages to said PA module.

* * * * *